United States Patent [19]

Ackroyd et al.

[11] Patent Number: 5,610,818
[45] Date of Patent: Mar. 11, 1997

[54] REMOTE OPERATED COMPUTER ASSISTED PRECISE PILE DRIVING AND RIG DRILLING SYSTEM

[75] Inventors: Neil Ackroyd, North Walsham, United Kingdom; Gary S. Chisholm, Christchurch, New Zealand; Robert G. Culling, Christchurch, New Zealand; Brent O'Meagher, Christchurch, New Zealand; Steve Smith, Sunnyvale, Calif.

[73] Assignee: Trimble Navigation Limited, Sunnyvale, Calif.

[21] Appl. No.: 561,699

[22] Filed: Nov. 22, 1995

[51] Int. Cl.⁶ .................................................. G01B 11/26
[52] U.S. Cl. .................................... 364/424.07; 356/141.1
[58] Field of Search ........................ 364/424.07, 449; 356/141.1

[56] References Cited

U.S. PATENT DOCUMENTS

| | | |
|---|---|---|
| 4,013,875 | 3/1977 | McGlynn ........................ 235/150.2 |
| 4,136,955 | 1/1979 | Aeschlimann et al. ................. 356/152 |
| 4,796,198 | 1/1989 | Boultinghouse et al. ............. 364/513 |
| 4,830,489 | 5/1989 | Cain et al. ........................... 356/73 |
| 4,936,678 | 6/1990 | Gordon et al. ....................... 356/375 |
| 5,100,229 | 3/1992 | Lundberg et al. ...................... 356/1 |
| 5,477,459 | 12/1995 | Clegg et al. ....................... 364/424.07 |
| 5,548,397 | 8/1996 | Kool et al. ......................... 356/141.1 |
| 5,553,407 | 9/1996 | Stump ............................... 364/424.07 |

*Primary Examiner*—Kevin J. Teska
*Assistant Examiner*—Stephen J. Walder, Jr.
*Attorney, Agent, or Firm*—Boris G. Tankhilevich

[57] ABSTRACT

The system for the remote computer assisted precise pile driving and rig drilling operations is disclosed. The system includes a base station, a computer assisted precise pile driving and rig drilling (CAPPDARD) system, and a communication link. The CAPPDARD system includes a moving platform including a piling rig and a mast, a location determination means, a computer, and a communication means. The CAPPDARD system can be operated manually or remotely from the base station.

57 Claims, 6 Drawing Sheets

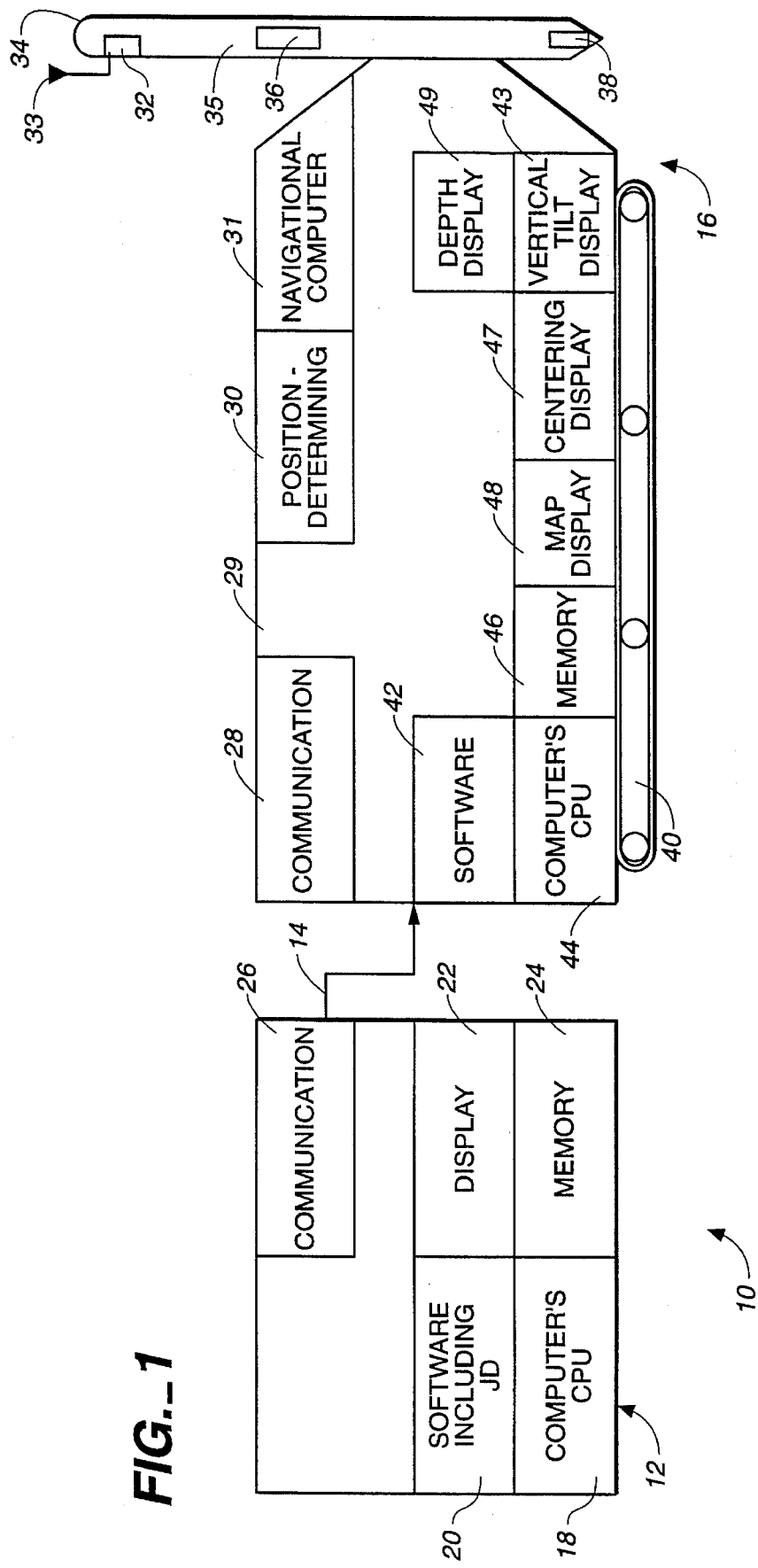

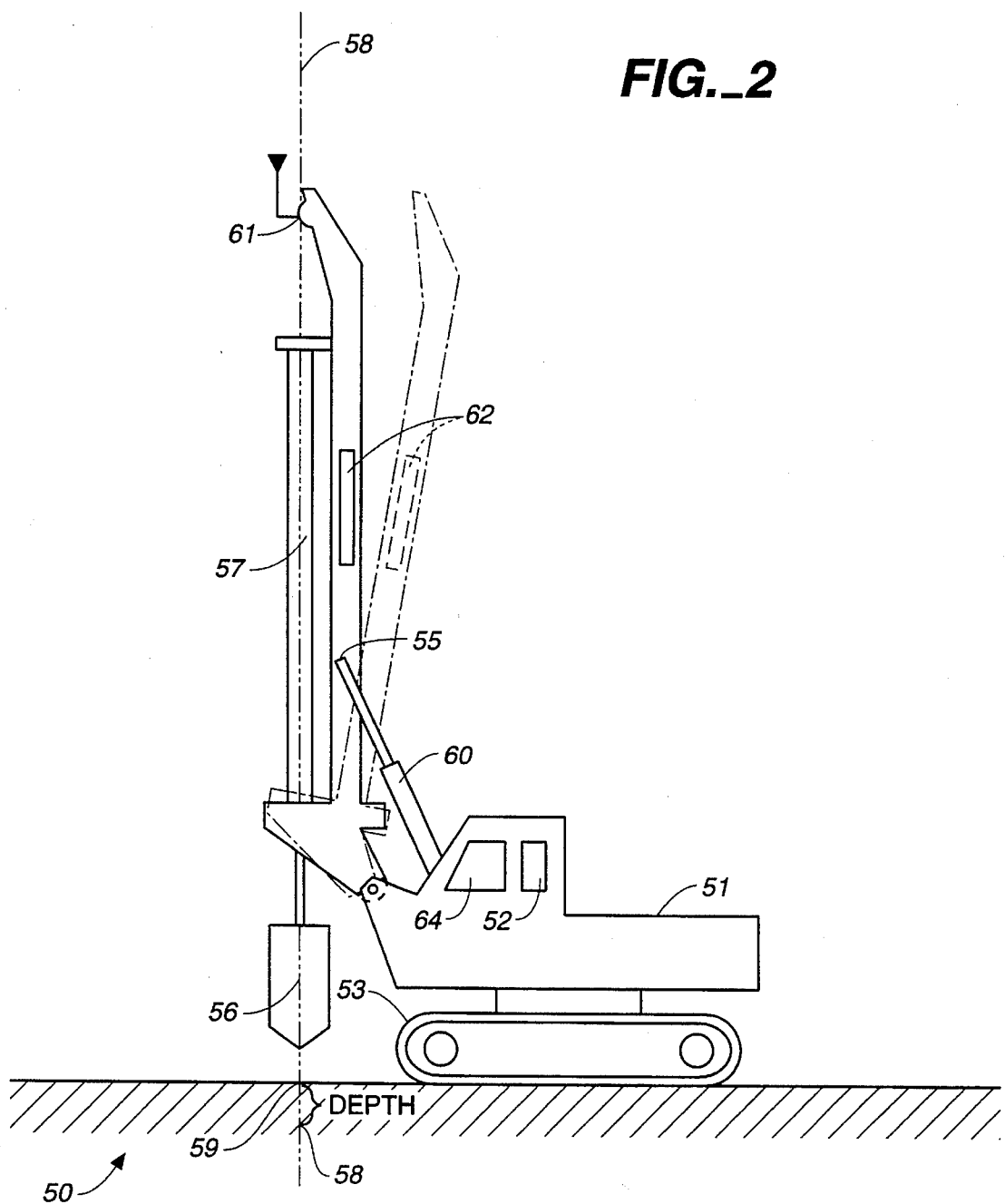
FIG._2

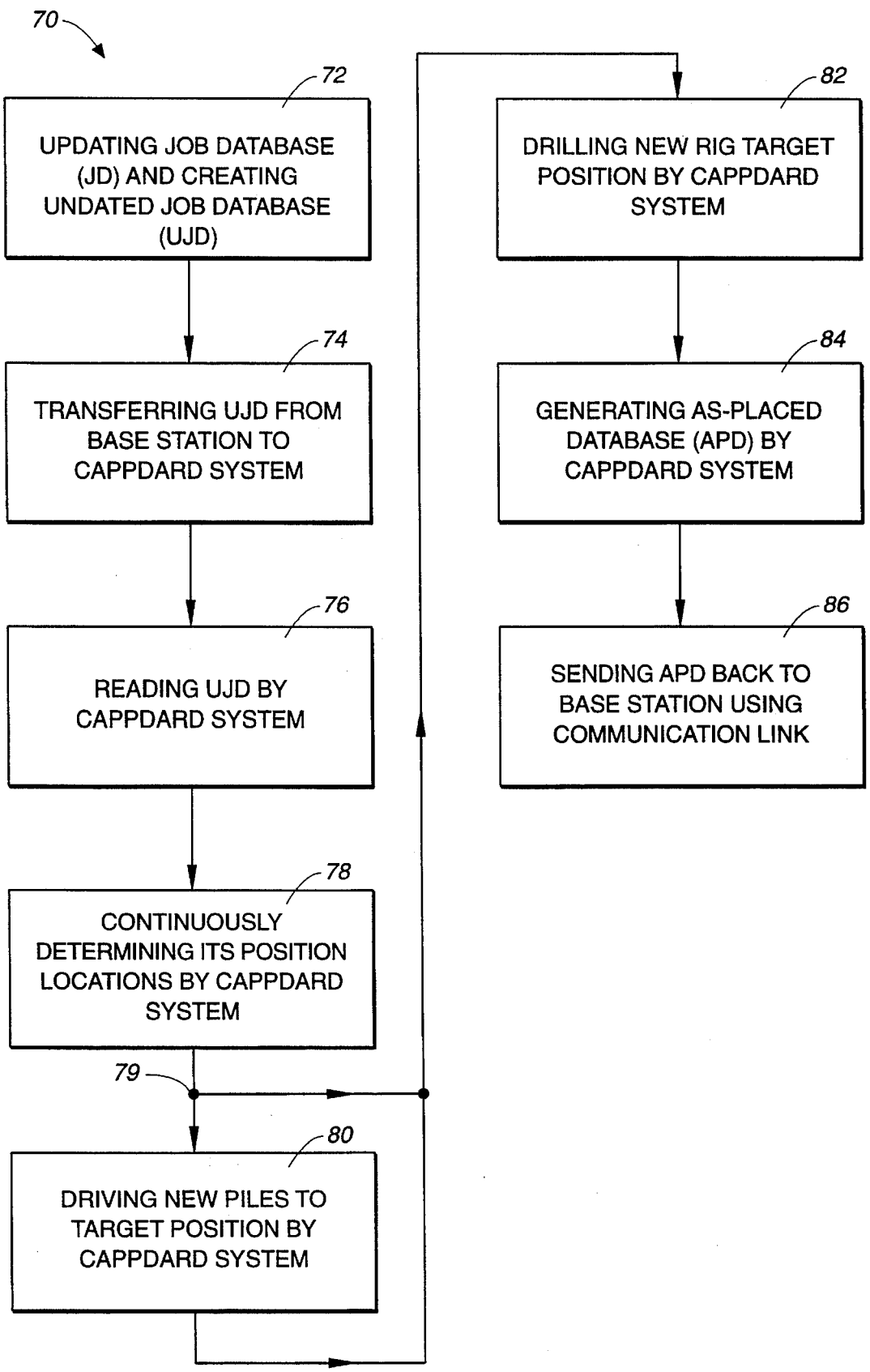
FIG._3

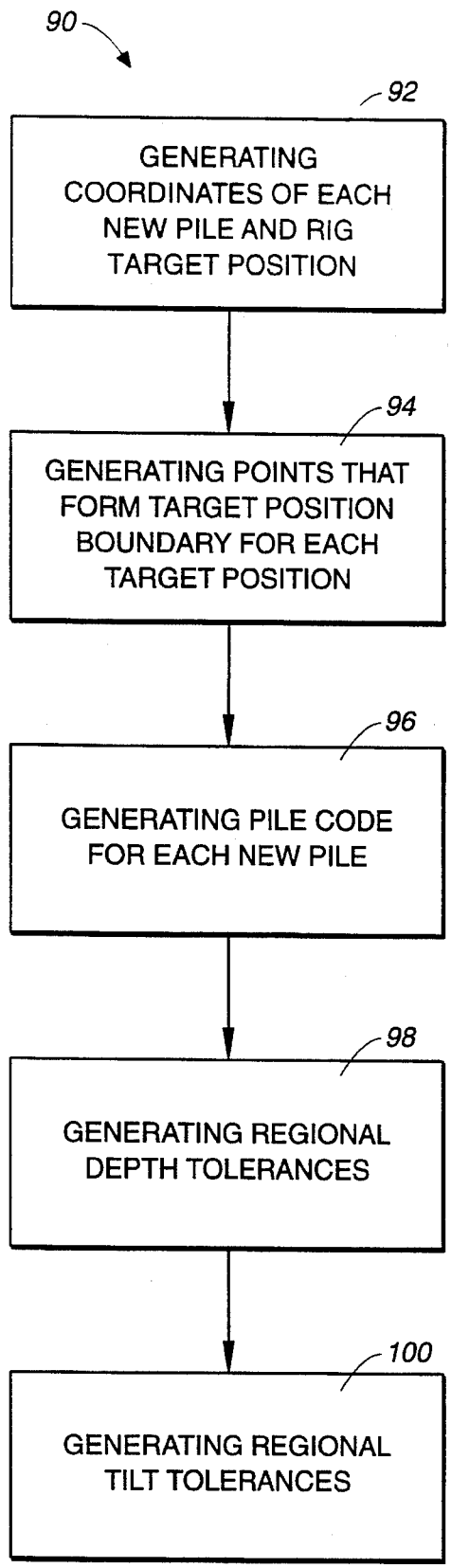
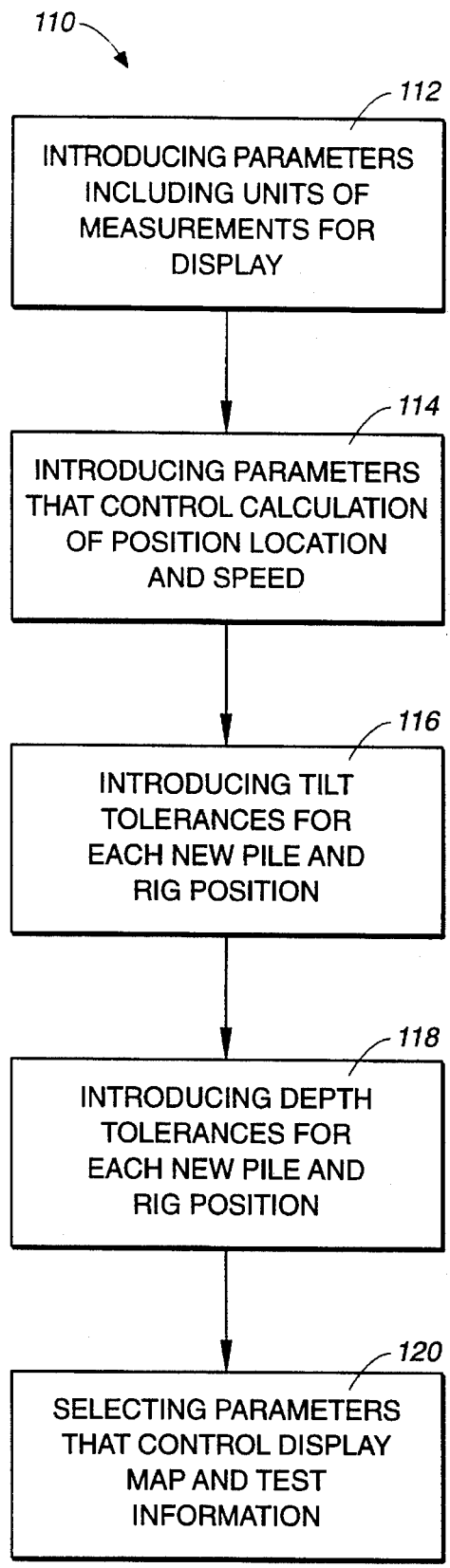
FIG._4A  FIG._4B

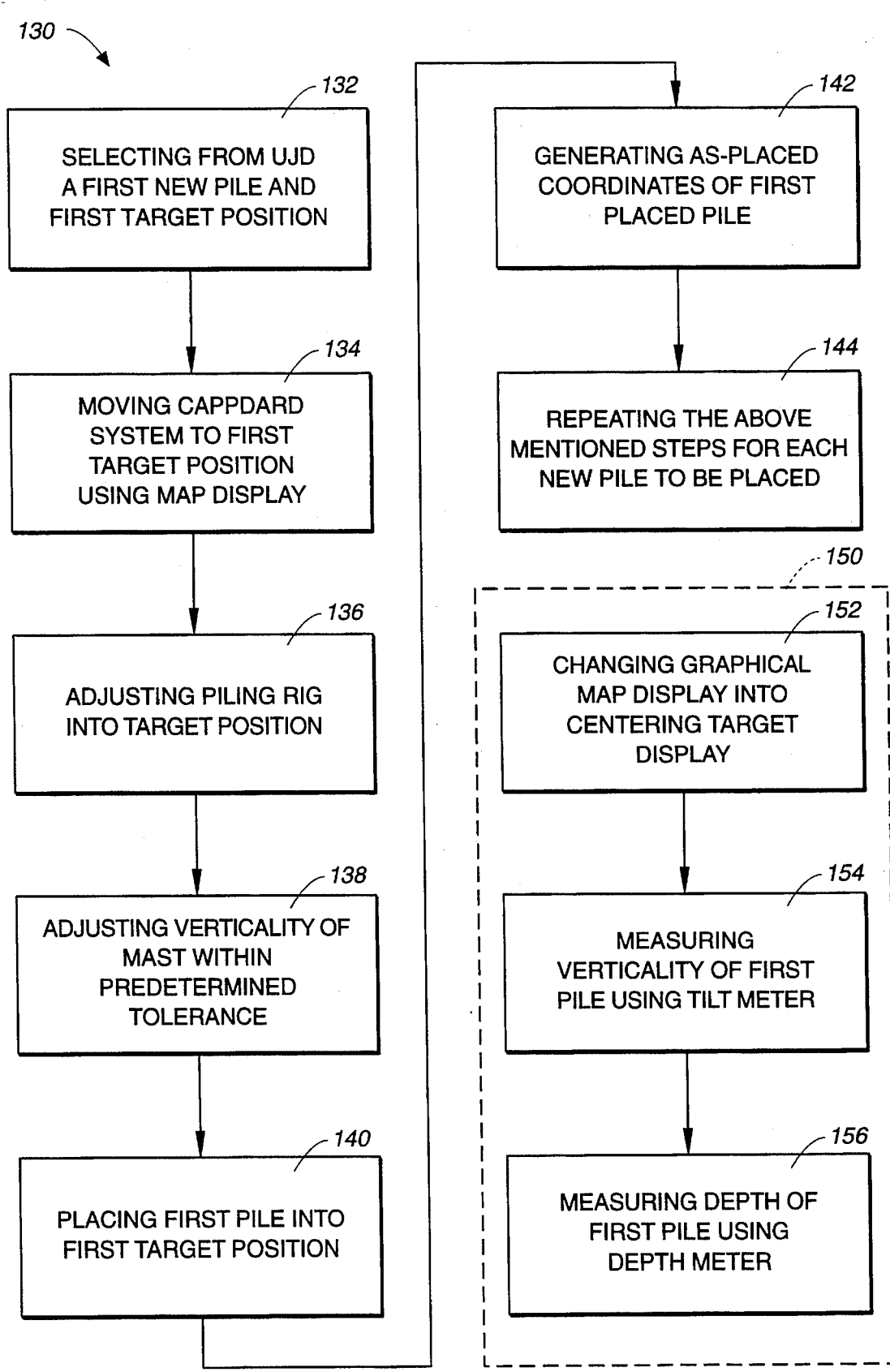
FIG._5

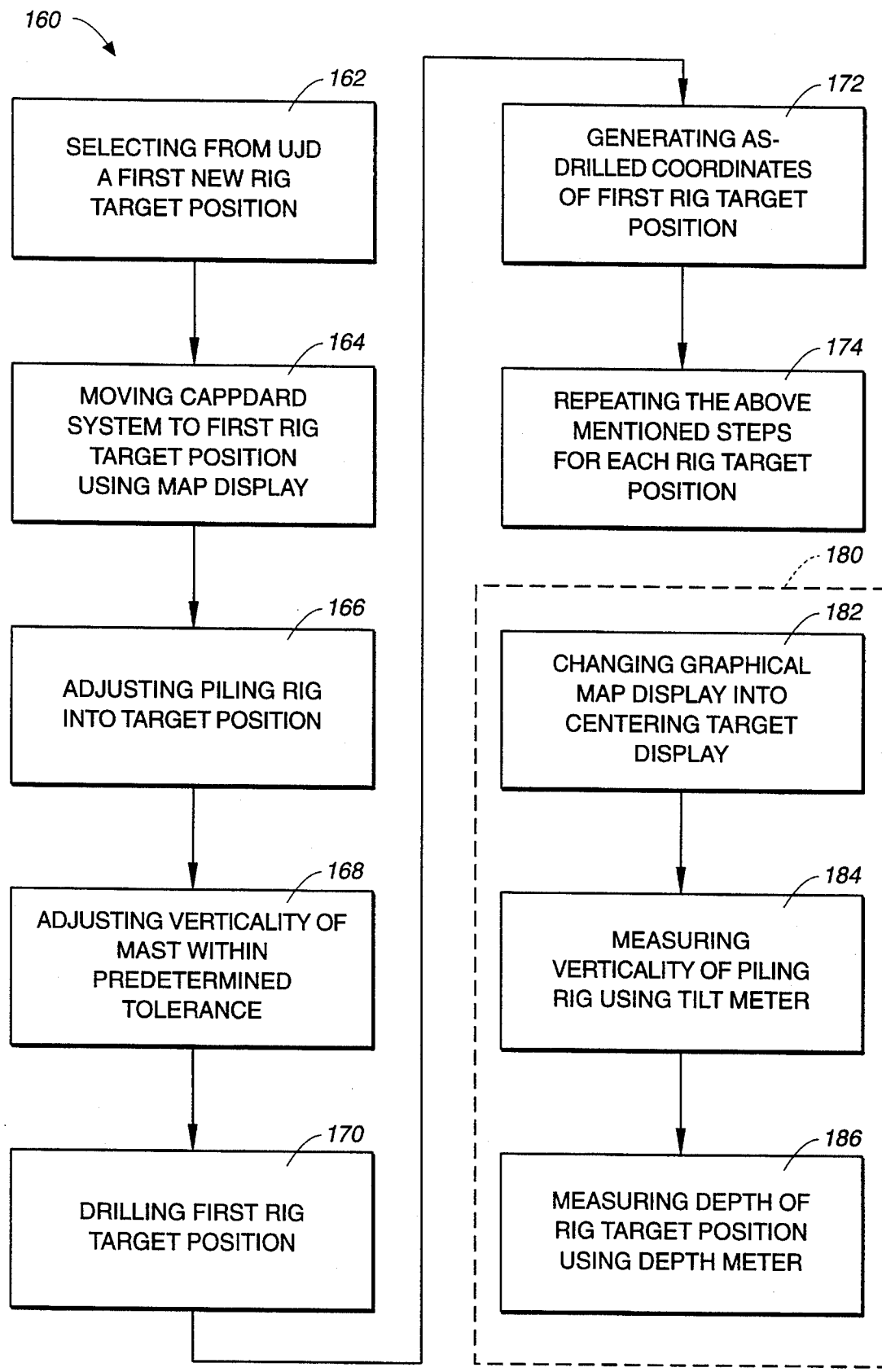
FIG._6

REMOTE OPERATED COMPUTER ASSISTED PRECISE PILE DRIVING AND RIG DRILLING SYSTEM

BACKGROUND

There have been many efforts to automate an operation of the construction machinery. For example, a device for automatic control of earth-moving machines is described in U.S. Pat. No. 3,009,271 issued to Kuehne, et al. The Kuehne patent describes a method in which an analysis of the grading problem is made and recorded. Range and azimuth information and elevational information are generated by a complex opical mechanical system for indicating the depth the earth moving machine should make at a particular point. The Kuehne invention includes an optical signal generator at a fixed geographical point, means for modulating the optical signal to include the information relative to the cut to be made, and means for producing range and azimuth indicating signals which define the relative position of the optical radiating signal device and the earth moving machine.

Clegg in U.S. Pat. No. 4,807,131 discloses a fully automated earth grading machine and system. The Clegg's invention comprises a digital processor, an elevation signal generator for generating a digital signal which is a function of the elevation of the cutting blade of an earth mover relative to an elevation reference point, a position signal generator, a data reference signal generator, a display, and a one or more index symbols. A significant advantage of the invention is the use of the display that allows to observe the earth grading process on the screen. In the preferred embodiment, the Clegg system displayed on the screen the target elevation and the cross slope angle at the position occupied by the grading blade at each point in time and at each location as the grader moves.

Another effort was made in the International Patent having an International Publication Number No. WO 95/19576 and having an International Patent Classification No. G01S 5/14, 5/02, wherein the method and apparatus for positioning construction machinery is disclosed. A construction machine such as a piling rig can be correctly positioned on a work site by providing the machine with a mast having a nominally vertical axis passing through the center of operation of the machine at ground level, providing a satellite navigation system receiver and locating its antenna on the axis at the top of the mast, providing means for determining the displacement of the mast from its nominal vertical position, obtaining output readings from the navigation system receiver, and positioning the machine in response to the output readings.

However, the described above method and apparatus for positioning construction machinery requires the presence of the human operator on the job site. An automatic and remote mode of operation of such system is not disclosed.

On the other hand, the remote operation of the apparatus and the system for positioning of the construction machinery is needed in many practical situations. For example, for operation of the underwater pile driving or rig drilling machinery the remote control is highly desirable.

This need for the remote operation of the apparatus and the system for positioning of the construction machinery is addresses by the present invention.

One aspect of the present invention is directed to a method for remote computer assisted precise pile driving and rig drilling. The method employs: (1) a base station including (a) a base station computer, and (b) a base station software including a job database (JD); (2) a computer assisted precise pile driving and rig drilling (CAPPDARD) system; and (3) a communication link. The CAPPDARD system further includes (1) a moving platform; (2) a location determination means; (3) a piling rig for performing the rig-drilling and the pile-driving operations, wherein the piling rig further includes a mast; (4) a computer attached to the platform; wherein the computer further comprises: (a) a graphical computer map display, (b) a centering computer map display, (c) a verticality tilt display, and (d) a computer memory; and (5) a receiving-transmitting means.

The method comprises the steps of: (1) updating the JD, wherein an updated job database (UJD) is created; (2) transferring the UJD from the base station to the CAPPDARD system using the communication link; (3) reading the UJD by the CAPPDARD system; (4) continuously determining its position locations by the CAPPDARD system; (5) driving new piles to the new piles target positions by the CAPPDARD system according to the UJD; (6) drilling the new rig target positions by the CAPPDARD system according to the UJD; (7) generating by the CAPPDARD system an As-Placed database (APD) of As-Placed coordinates of the new piles and the new rig target positions; and (8) sending the APD back to the base station using the communication link.

In the preferred embodiment the step of updating the JD further includes the steps of: (1) adding the initial coordinates of new piles to the JD; (2) selecting and adding to the JD the coordinates of the new piles target positions and the coordinates of the new rigs target positions; and (3) selecting the configuration parameters for navigation and adding the configuration navigation parameters to the JD.

In one embodiment, the step of adding the initial coordinates of new piles and new rigs to the JD further includes the step of keying in the JD by the operator the initial coordinates of each new pile. In another embodiment, the step of adding the initial coordinates of new piles to the JD further includes the step of loading in the JD a PILE FILE containing the initial coordinates of each new pile. The step of selecting and adding to the JD the coordinates of the new piles target positions and the coordinates of the new rigs target positions further includes the step of generating a TARGET POSITIONS FILE.

In the preferred embodiment, the step of generating the TARGET POSITIONS FILE further includes the steps of: (1) generating the coordinates of each new pile and rig target positions; (2) generating the points that form the target position boundary for each new pile target position and for each rig target position; (3) generating the pile code for each new pile; (4) generating the required depth tolerances for each new pile target position and for each new rig target position; and (5) generating the required tilt tolerances for each the new pile target position and for each the rig target position.

In one embodiment, the step of selecting the configuration parameters for navigation and adding the configuration parameters to the JD further includes the steps of: (1) introducing the parameters including the units of measurements that are used by the CAPPDARD computer display; (2) introducing the parameters that control the calculation by the CAPPDARD computer the coordinates of each new target positions, wherein the coordinates of each new target position are determined by using the location determination means; (3) introducing the tilt tolerances parameters for each new pile target position and for each rig target position; (4) introducing the depth tolerance parameters for each new rig target position; (5) selecting the parameters that control the displayed graphical information on the CAPPDARD computer map display; and (6) selecting the parameters that control the displayed text information on the CAPPDARD computer map display.

The step of continuously determining its position locations by the CAPPDARD system further includes the step of determining its position locations by: (1) an inertial navigation system; or (2) a gyroscope system; or (3) a local magnetic field sensor system; or (4) a Global Positioning System Receiver; or (5) a Global Orbiting Navigational Satellite System Receiver; or (6) a ground-based location determination system including: a Loran system; or a Tacan system; or a Decca system; or an Omega system; or a JTIDS Relnav system; or a PLRS system; or a VOR/DME Receiver.

The step of transferring the updated job database (UJD) from the base station to the CAPPDARD system using the communication link further includes the step of using: (1) a mechanical means for transferring the UJD from the base station to the CAPPDARD system; or (2) a radiowave frequency band; or (3) an infrared frequency band; or (4) a microwave frequency band; or (5) the ISM (industrial scientific medical) unlicensed operation band, wherein the ISM band range is selected from a class of frequency range consisting of 900 MHz, 2.4 GHz, and 5.8 GHz, and wherein the user can own the both ends of the ISM communication system; or (6) a real time circuit switched communication link; or (7) a 1.8 GHz band, wherein the 1.8 GHz band supports the personal communications services (PCS); or (8) a Low Earth Orbiting Satellites (LEOS), wherein the LEOS is used to store and to forward digital packet data; or (9) a communication means, and wherein the communication means is selected from a class of radiowave communication means consisting of a cellular telephone communication means, paging signal receiving means, a wireless messaging services, a wireless application services, a wireless WAN/LAN station, and an Earth-satellite-Earth communication module that uses at least one satellite to relay a radiowave signal; or (10) a communication means, and wherein the communication means includes an Advanced Mobile Phone System (AMPS) including a modem, and wherein the modem is selected from a class consisting of a DSP (digital signal processor) modem, and a cellular digital packet data (CDPD) modem; or (11) a communication means, wherein the communication means includes a digital cellular telephone communication means, and wherein the digital cellular telephone communication means includes a means of modulation of digital data over a radiolink selected from a class consisting of a time division multiple access (TDMA) system, and a code division multiple access (CDMA) system; or (12) a communication means, wherein the communication means includes a fax wireless communication means.

In one preferred embodiment, the step of driving the new piles to the new piles target positions by the CAPPDARD system according to the UJD further includes the steps of: (1) selecting from the UJD a first new pile to place and a target position for the first new pile; (2) moving the driving rig of the CAPPDARD system to the target position of the first pile using a map display information and a text display information; (3) adjusting the piling rig into the target position; (4) adjusting the verticality of the mast within the predetermined tolerance; (5) placing the first pile into the first target position; (6) generating and recording the As-Placed coordinates of the first placed pile; and (7) repeating the above mentioned steps for each the pile to be placed according to the UJD.

In another preferred embodiment, the CAPPDARD system further includes a depth meter and a tilt meter. In this embodiment, the step of drilling the new rig target positions by the CAPPDARD system according to the UJD further includes the steps of: (1) selecting from the UJD a first new rig target position; (2) moving the piling rig of the CAPPDARD system to the first rig target position using a map display information and a text display information; (3) adjusting the piling rig into the target position; (4) adjusting the verticality of the mast within the predetermined tolerance; (5) drilling the piling rig into the first rig target position; (6) measuring the depth of the first placed pile by the depth meter; (7) measuring the depth of the first rig target position by the depth meter; (8) generating and recording the As-Drilled coordinates of the first rig target position; and (9) repeating the above mentioned steps for all the rig target positions to be drilled according to the UJD.

Yet, in one more embodiment, the step of adjusting the piling rig into the target position further includes the steps of: (1) changing the graphical map display into the centering target display when the piling rig gets closer than a predetermined distance from the target position; and (2) displaying the verticality tilt of the first pile using the verticality tilt display.

Yet, in another embodiment, the CAPPDARD system further includes a tilt meter and a depth meter. The step of adjusting the piling rig into the target position in this embodiment further includes the step of: (1) changing the graphical map display into a centering target display when the piling rig gets closer than a predetermined distance from the target position; (2) measuring the verticality of the first pile graphically by using the tilt meter; (3) measuring the verticality of the piling rig by using the tilt meter; and (4) displaying the measured verticality tilt of the first rig target position using the tilt display.

In the preferred embodiment, the step of generating by the CAPPDARD system an As-Placed database (APD) of the new piles and the new rig target positions further includes the step of recording into one the As-Placed database As-Placed coordinates for each the placed pile and As-Drilled coordinates for each the drilled rig target position.

Another aspect of the present invention is directed to a system for remote computer assisted precise pile driving and rig drilling. In the preferred embodiment, the system further comprises: (1) a computer assisted precise pile driving and rig drilling system (CAPPDARD); (2) a base station; and (3) a communication link connecting the CAPPDARD system and the base station.

In the preferred embodiment, the CAPPDARD system further comprises: (1) a moving platform; wherein the moving platform further includes a piling rig connected to the moving platform, and a mast connected to the piling rig, wherein the mast includes a nominally vertical axis passing through the center of operation of the piling rig at ground level; (2) a location determination means attached to the moving platform; (3) a computer attached to the platform; wherein the computer further comprises: a computer display; a computer memory connected to the computer display; and a computer software loaded into the computer memory; and (4) a communication means connected to the computer.

In one embodiment, the CAPPDARD system further comprises: a tilt meter connected to the moving platform; a depth meter connected to the moving platform; a centering map display connected to the computer; and a verticality tilt display connected to the computer.

In the preferred embodiment, the base station further comprises: (1) a base station computer; (2) a base station communication means connected to the base station computer; and (3) a base station software including an initial job database (JD) and an updated job database (UJD), wherein the base station software is installed into the base station computer.

In one embodiment, the location determination means can be selected from a class of self-contained location determination systems, mounted on the moving platform, consisting of an inertial navigation system, a gyroscope system, and a local magnetic field sensor system.

In another embodiment, the location determination means can be selected from a class of satellite-based location determination systems consisting of a Global Positioning System Receiver and a Global Orbiting Navigational Satellite System Receiver.

Yet, in one more embodiment, the location determination means can be selected from a class of ground-based location determination systems consisting of Loran, Tacan, Decca, Omega, JTIDS Relnav, PLRS, and VOR/DME Receiver.

In different embodiments, the communication link can include: (1) a mechanical means for transferring the UJD from the base station to the CAPPDARD system; (2) a radiowave frequency band; (3) an infrared frequency band; (4) a microwave frequency band; (5) the ISM (industrial scientific medical) unlicensed operation band, wherein the ISM band range is selected from a class of frequency range consisting of 900 MHz, 2.4 GHz, and 5.8 GHz; and wherein the user can own the both ends of the ISM communication system; (6) a real time circuit switched communication link; (7) a 1.8 GHz band, wherein the 1.8 GHz band supports the personal communications services (PCS); (8) a Low Earth Orbiting Satellites (LEOS), wherein the LEOS is used to store and to forward digital packet data; (9) the communication means selected from a class of radiowave communication means consisting of a cellular telephone communication means, paging signal receiving means, a wireless messaging services, a wireless application services, a wireless WAN/LAN station, and an Earth-satellite-Earth communication module that uses at least one satellite to relay a radiowave signal; (10) the communication means including an Advanced Mobile Phone System (AMPS) including a modem, and wherein the modem is selected from a class consisting of a DSP (digital signal processor) modem, and a cellular digital packet data (CDPD) modem; (11) the communication means including a digital cellular telephone communication means, wherein the digital cellular telephone communication means includes a means of modulation of digital data over a radiolink selected from a class consisting of a time division multiple access (TDMA) system, and a code division multiple access (CDMA) system; and (12) a fax wireless communication means.

In one preferred embodiment, the CAPPDARD system is operated by a human operator.

In another preferred embodiment, the CAPPDARD system further includes a navigational computer attached to the moving platform, and the CAPPDARD system is operated by the navigational computer.

BRIEF DESCRIPTION OF THE DRAWINGS.

FIG. 1 depicts a remote computer assisted precise pile driving and rig drilling system.

FIG. 2 illustrates a piling rig part of a computer assisted precise pile driving and rig drilling (CAPPDARD) system.

FIG. 3 shows a flow chart describing the basic steps of a method for remote computer assisted precise pile driving and rig drilling.

FIG. 4A depicts a flow chart illustrating the steps of generating the TARGET POSITIONS FILE.

FIG. 4B is a flow chart that shows the steps of selecting the configuration parameters for navigation and adding the configuration parameters to the job database (JD).

FIG. 5 illustrates a flow chart that depicts the steps of driving the new piles to the new piles target positions by the CAPPDARD system.

FIG. 6 is a depiction of a flow chart that illustrates the steps of drilling the new rigs target positions by the CAPPDARD system.

FULL DESCRIPTION OF THE PREFERRED EMBODIMENT.

FIG. 1 illustrates a remote operated computer assisted precise pile driving and rig drilling system 10. A base station 12 is integrated with a computer assisted precise pile driving and rig drilling (CAPPDARD) system 16 which is used for precise pile driving and rig drilling operations.

In the preferred embodiment, the base station 12 includes a computer including a CPU 18, a display 22, a memory means 24, and a software package including a Job Database (JD) 20. The computer can be implemented by using a personal computer with an Intel-486 or Pentium chip running a Microsoft Windows®-95 operating system. A Job Database 20 can be implemented by using a Paradox® database engine manufactured by Borland, Scotts Creek, Calif. The display 22 can include a liquid crystal display (LCD), or a cathode ray tube (video) screen.

In the preferred embodiment, the CAPPDARD system includes a position determining means 30.

In one embodiment, the position determination means can include a satellite positioning system (SATPS) receiver, such as a global positioning system (GPS) receiver 32, or a Global Orbiting Navigational Satellite System (GLONASS) Receiver. Yet, in another embodiment, the position determination means can include an inertial navigation system, a gyroscope system, or a local magnetic field sensor system. Yet, in one more embodiment, the location determination means includes a Loran, Tacan, Decca, Omega, JTIDS Relnav, PLRS, or VOR/DME Receiver.

In the preferred embodiment, the position determining means includes a Global Positioning System (GPS) receiver 32 with a GPS antenna 33. The GPS antenna may be a magnetically mountable model 21423-00 commercially available from Trimble Navigation of Sunnyvale, Calif., and may be placed on the moving platform 29 with the direct view of the sky as shown in FIG. 1. The GPS receiver can be a model 7400MSi™ L1/L2 Dual Frequency, manufactured by Trimble Navigation. In the preferred embodiment, the GPS antenna 33 is able to receive the satellite signals from at least four satellite-vehicles that are part of the GPS.

The GPS is a system of satellite signal transmitters, with receivers located on the Earth's surface or adjacent to the Earth's surface, that transmits information from which an observer's present location and/or the time of observation can be determined. There is also the Global Orbiting Navigational System (GLONASS), which can operate as an alternative GPS system.

The GPS is part of a satellite-based navigation system developed by the United States Defense Department under its NAVSTAR satellite program. A fully operational GPS includes up to 24 Earth satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to three or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency f1=1575.42 MHz and an L2 signal having a frequency f2=1227.6 MHz. These two frequencies are integral multiples f1=1540 f0 and f2=1200 f0 of a base frequency f0=1.023 MHz. The L1 signal from each satellite is binary phase shift key (BPSK) modulated by two pseudorandom noise (PRN) codes in phase quadrature, designated as the C/A-code and P(Y)-code. The L2 signal from each satellite is BPSK modulated by only the P(Y)-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay~$f^2$). This phenomenon is discussed by MacDoran in U.S. Pat. No. 4,463,357, which discussion is incorporated by reference herein. When transit time delay through the ionosphere is determined, a phase delay associated with a given carrier signal can also be determined.

Use of the PRN codes allows use of a plurality of GPS satellite signals for determining an observer's position and for providing the navigation information. A signal transmitted by a particular GPS satellite is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P(Y)-code, is a relatively long, fine-gained code having an associated clock or chip rate of 10 f0=10.23 MHz. A second PRN code for each GPS satellite, sometimes referred to as a clear/acquisition code or C/A-code, is intended to facilitate rapid satellite signal acquisition and hand-over to the P(Y)-code and is a relatively short, coarser-grained code having a clock or chip rate of f0=1.023 MHz. The C/A-code for any GPS satellite has a length of 1023 chips or time increments before this code repeats. The full P(Y)-code has a length of 259 days, with each satellite transmitting a unique portion of the full P(Y)-code. The portion of P(Y)-code used for a given GPS satellite has a length of precisely one week (7.000 days) before this code portion repeats. Accepted methods for generating the C/A-code and the P(Y)-code are set forth in the document GPS Interface Control Document ICD-GPS-200, published by Rockwell International Corporation, Satellite Systems Division, Revision B-PR, 3 Jul. 1991, which is incorporated by reference herein.

The GPS satellite bit stream includes navigational information on the ephemeries of the transmitting GPS satellite (which includes a complete information about the transmitting satellite within the next several hours of transmission) and an almanac for all GPS satellites (which includes less detailed information about all other satellites). The satellite information has the parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in *The NAVSTAR Global Positioning System,* Tom Logsdon, Van Nostrand Reinhold, New York, 1992, pp. 17–90.

A second alternative configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9k/16) GHz and f2=(1.246+7k/16) GHz, where k (=0,1,2, . . . 23) is the channel or satellite number. These frequencies lie in two bands at 1.597–1.617 GHz (L1) and 1,240–1,260 GHz (L2). The L1 code is modeled by a C/A-code (chip rate=0.511 MHz) and by a P(Y)-code (chip rate=5.11 MHz).

The L2 code is presently modeled only by the P(Y)-code. The GLONASS satellites also transmit navigational data at a rate of 50 Baud. Because the channel frequencies are distinguishable from each other, the P(Y)-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS satellites.

The range ($R_i$) between the location of the i-th SATPS satellite and the SATPS receiver is equal to the speed of light c times ($\Delta t_i$), wherein ($\Delta t_i$) is the time difference between the SATPS receiver's clock and the time indicated by the satellite when it transmitted the relevant phase. However, the SATPS receiver has an inexpensive quartz clock which is not synchronized with respect to the much more stable and precise atomic clocks carried on board the satellites. Consequently, the SATPS receiver actually estimates not the true range Ri to the satellite but only the pseudo-range (ri) to each SATPS satellite.

The SATPS receiver is capable of determining receiver absolute position in an Earth-centered, Earth-fixed coordinate reference system utilized by the SATPS by obtaining the navigational solution of the set of four simultaneous equations:

$$(x1-x0)^2+(y1-y0)^2+(z1-z0)^2=(r1-cb)^2 \quad \text{(Eq. 1)}$$

$$(x2-x0)^2+(y2-y0)^2+(z2-z0)^2=(r2-cb)^2 \quad \text{(Eq. 2)}$$

$$(x3-x0)^2+(y3-y0)^2+(z3-z0)^2=(r3-cb)^2 \quad \text{(Eq. 3)}$$

$$(x4-x0)^2+(y4-y0)^2+(z4-z0)^2=(r4-cb)^2 \quad \text{(Eq. 4)}$$

wherein:

(ri) is a pseudorange between the i-th satellite and the SATPS receiver;

(xi, yi, zi) is a 3-dimension coordinate of the i-th SATPS satellite;

(x0, y0, z0) is a 3-dimension unknown coordinate of the SATPS receiver position;

(cb) is the SATPS receiver clock bias error.

After the SATPS receiver determines the coordinates of the i-th SATPS satellite by picking up transmitted ephemeries constants, the SATPS receiver can obtain the solution of the set of the four equations for its unknown coordinates (x0, y0, z0) and for unknown time bias error (cb). The SATPS receiver can also obtain its heading and speed. (See *The Navstar Global Positioning System*, Tom Logsdon, Van Nostrand Reinhold, 1992, pp. 8–33, 44–75, 128–187.)

The CAPPDARD system 16 can communicate with the base station 12 using a CAPPDARD communicating means 28, a base station communicating means 26, and a communication link 14 as shown in FIG. 1.

In general, the communication link can employ a radiowave frequency band, an infrared frequency band, or a microwave frequency band.

In one embodiment, the communication link can include the ISM (industrial scientific medical) unlicensed operation band, including 900 MHz, 2.4 GHz, or 5.8 GHz bands, wherein the user can own the both ends of the ISM communication system. The ISM technologies are manufactured by Metricom, Los Gatos, Calif., and by Utilicom, Santa Barbara, Calif.

In another embodiment, the communication link can employ a 1.8 GHz band that supports the personal communications services (PCS). The PCS uses the international standard DCS-1800. Yet, in one more embodiment, the communication link can include a real time circuit switched communication link. For instance, the communication link employing a real time circuit switched communication link can include the Iridium satellite system produced by Motorola, Schaumburg, Ill. In one additional embodiment, the communication link can employ a Low Earth Orbiting Satellite (LEOS) which can be used to store and to forward digital packet data. The LEOS systems in 27 GHz range are manufactured by Teledesic located in Redmond, Washington, and the LEOS systems in 5 GHz range are produced by Oriscom located in Chantilly, Va.

The communication means can include a cellular telephone communication means, a paging signal receiving means, a wireless messaging services, a wireless application services, a wireless WAN/LAN station, or an Earth-satellite-Earth communication module that uses at least one satellite to relay a radiowave signal.

The communication means can include the cellular telephone communication means including an Advanced Mobile Phone System (AMPS) with a modem. The modem can comprise a DSP (digital signal processor) modem in 800 MHz range, or a cellular digital packet data (CDPD) modem in 800 MHz range. The cellular digital communication means includes a means of modulation of digital data over a radiolink using a time division multiple access (TDMA) system employing format IS-54 or a code division multiple access (CDMA) system employing format IS-95. The TDMA system used in Europe is called groupe special mobile (GSM) in French. The GSM system can be also used in one of the embodiments.

In New Zealand and Australia the 900 MHz band can be used without license. The 900 MHz band is one of the embodiments for the communication link of the present invention. In Far East and in Japan the widely used 450 MHz band can be employed as the communication link of the present invention.

Yet, in one more embodiment, the communication link 14 includes a mechanical means for transferring the data from the base station to the CAPPDARD system back and forth. The data can be written on the floppy diskette, on the CD, or on any other memory device capable of writing on and retrieving from the information. The mechanical means can include a human, or a robot device.

In the preferred embodiment, the CAPPDARD system further includes a computational computer including a CPU 44, a memory means 46, a software package 42, a map display 48, a centering display 47, a depth display 49, and a verticality tilt display 43. In the remote mode of operation the CAPPDARD system can additionally include a navigational computer 31. Both the computational computer and the navigational computer can be implemented using a Pentium based PC loaded with a Microsoft® Windows-95 operating system. It is understood, that the base station computer, the CAPPDARD computational computer, and the CAPPDARD navigational computer can be implemented using any other PC employing the Intel based 486, 386, 286 chips, or Motorola based Power chip, or Digital Equipment Corporation based Alpha Chip, or any other chip. It is also understood, that instead of Microsoft® Windows-95 operating system, any other operating system, like Microsoft® Windows-3.1, Microsoft® DOS, or IBM OS/2, can be employed for the purposes of the present invention.

In the preferred embodiment, the CAPPDARD system further includes a piling rig 34 including a mast 35, a tilt meter 36, and a depth meter 38. Various kinds of tiltmeter (or inclinometer) are available and can be used to determine displacements of the mast from the vertical. The requirements are for a response time of a fraction of a second or better and an accuracy of the order of 1 in 2500 (to support an accuracy of 10 millimeters when the mast is 25 meters high). At present, the preferable tiltmeters include the gyroscopic tiltmeters and those based on self-levelling of fluids with appropriate viscosity to damp oscillations.

FIG. 2 depicts the piling rig part 50 of the CAPPDARD system in one preferred embodiment. In this embodiment, the piling rig comprises a body 51, a driver's cab 52 rotatably mounted on a tracked base 53, which can be driven relatively precisely in a forward and rearward direction and can be steered by differentially driving its two tracks in the usual way.

The piling rig includes a mast 55 having a nominally vertical rotation axis 58 passing through the center of operation of the machine at ground level 59. The mast supports an auger 56 with appropriate drive gear 57. The hydraulic mechanism 60 holds the mast upright. The intersection 59 of the axis with the ground determines where the auger will enter the ground and the pile will be formed.

In the preferred embodiment the piling rig includes the GPS receiver's antenna 61 that is located on the axis at the top of the mast. The GPS receiver determines the mast position location and provides an output representing displacement from a target position. The driver's display 52 shows the distance of the auger from its target position.

In one more embodiment, the piling rig can drill or pile at a specified angle and bearing (directional piling/drilling) using the GPS position, heading and tilt information. In this embodiment, the mast has to be supported in the non-vertical position and the tiltmeter has to be able to measure the angle inclination of the mast from the predetermined non-vertical axis. It is submitted, that this mode of operation is also within the scope of the present invention.

FIG. 3 shows the flow chart 70 describing the steps of the method of the remote operated computer assisted precise pile driving and rig drilling operations. The base station operator at first updates the Job Database (JD) (step 72) by including into the current JD the list of new piles, the new piles coordinates, and the new pile codes. After that the base station operator selects the new piles target positions and generates an updated job database (UJD) by keying the information manually. The pile-driving UJD can be also prerecorded in the form of the ASCII file, or in the form of the DXF file, or in any other file-form. The rig-drilling UJD can be generated in the same manner.

The updated job database (UJD) can be recorded on the floppy diskette and mechanically transferred from the base station to the CAPPDARD system (step 74) manually or with the help of the robot-device. The UJD can be also transferred to the CAPPDARD system electronically by using the base station communication means, the CAPPDARD system communication means, and the communication link in different embodiments (see discussion above).

The UJD information (step 76) is read in by the CAPPDARD computer. The CAPPDARD position-determination means continuously determines the coordinates, heading and the speed of the CAPPDARD system (step 78). Therefore, the CAPPDARD system is able to continuously monitor its position location in relation to the pile target positions or in relation to the rig drilling target positions. After each the target position is reached, the CAPPDARD system performs the actual pile driving (step 80) or the rig drilling (step 82). The As-Placed coordinates of each new pile (the As-Drilled coordinates of each new rig target position) are recorded in the As-Placed (As-Drilled) Database (step 84). After the job is completed, the complete As-Placed database is sent back to the base station using the CAPPDARD communication means and the communication link (see discussion above).

FIG. 4A is a flow chart that is a more complete illustration of the step of updating the Job Database (JD) (step 72 in FIG. 3). In one embodiment, after generating the coordinates of each new pile and each new rig target positions (step 92), the base station operator generates by keying in: (a) the points that form the boundary line for each new target position (step 94); (b) the pile code for each new pile (step 96); (c) the required depth tolerances (step 98); and (d) the required tilt tolerances (step 100). In another embodiment, the coordinates of each new target position boundary, the pile codes, the depth and tilt tolerances are per-recorded in the form of the ASCII file, DXF file, or in any other file format.

FIG. 4B depicts a flow chart that details the step of selecting the configuration parameters for navigation and adding said configuration navigation parameters to the JD. This step is a sub-step of the step of updating the Job Database information (step 72 of FIG. 3). During this step the base station operator sets-up the configuration parameters for the navigation. These parameters include: (a) the units of measurement that are used for the display of the pile driving information in the CAPPDARD system map display and in the CAPPDARD centering display (step 112); (b) the parameters that control the calculation of the boundary coordinates of each target position from the position-determination means (step 114); (c) introducing the tilt tolerances for each new pile and each new rig target position into the CAPPDARD software engine (step 116); (d) introducing the depth tolerances for each new pile and each new rig target position into the CAPPDARD software engine (step 118); and (e) selecting the parameters that control the CAPPDARD system display map and text information (step 120).

The flow chart of FIG. 5 (130) illustrates the substeps of the step of driving the new piles to their target positions by the CAPPDARD system (the step 80 of FIG. 3). The substeps of the step of drilling the new rig target positions by the CAPPDARD system (the step 82 of FIG. 3) are depicted in the flow chart of FIG. 6 (130). The both operations are similar, therefore we limit our discussion to the discussion of the diagram of FIG. 5.

In one preferred embodiment, the CAPPDARD system is operated manually by a human operator. In another preferred embodiment, the CAPPDARD system is remotely operated from the base station using the CAPPDARD navigational computer. The flow chart of FIG. 5 (and the flow chart of FIG. 6 for this matter) is the same for both situations, therefore the discussion below is focused on the manually operated CAPPDARD system.

At first (step 132), the first pile and the first target position are selected from the UJD. Using the position-determination means, the CAPPDARD system continuously determines its position location while the operator steers the piling rig of the CAPPDARD system towards the first target position. The map and text information are used at this stage. (Step 134). When the CAPPDARD system is within the predetermined distance from the target position location, the map display is replaced with the centering map display (see the substep 152 of the step 134 in FIG. 5), and the verticality of the first pile is initially measured using the tilt meter (substep 154 of the step 134). In the preferred embodiment, the predetermined distance is 2 meters from the target position location, and the centering display is a bullseye display. A crosshair display is also provided which shows the current tilt of the piling rig mast.

Using the bullseye and the crosshair displays, the operator can adjust the piling rig onto the target position (step 136) as well as adjust the verticality of the mast (step 138). Once the crosshair and the bullseye displays advise the rig operator that the pile is within all defined tolerances, the operator may commence placing the pile into the first target position (step 140). At this time the depth of the pile can be measured using the depth meter (substep 156 of the step 140) and the As-Placed coordinate is recorded (step 142). When the placement of the first pile is completed, the operator selects the next pile to be placed and the above mentioned steps are repeated (step 144).

When all piles are placed and all rig target positions are drilled, the As-Placed and As-Drilled database are recorded and transferred to the base station. At this time, the base station operator can generate the Comparison report by comparison the As-Placed and the As-Drilled databases with the Updated Job Database (UJD).

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. A method for remote computer assisted precise pile driving and rig drilling, said method employing a base station including a base station computer, and a base station software including a job database (JD); a CAPPDARD system; and a communication link; said CAPPDARD system further comprising a moving platform, a location determination means, a piling rig for performing the rig-drilling and the pile-driving operations, said piling rig further including a mast, a computer attached to said platform, and a receiving-transmitting means, said computer further comprising, a graphical computer map display, a centering computer map display, a verticality tilt display, and a computer memory; said method comprising the steps of:

updating said JD, wherein an updated job database (UJD) is created;

transferring said UJD from said base station to said CAPPDARD system using said communication link;

reading said UJD by said CAPPDARD system;

continuously determining its position locations by said CAPPDARD system;

driving said new piles to said new piles target positions by said CAPPDARD system according to said UJD;

drilling said new rig target positions by said CAPPDARD system according to said UJD;

generating by said CAPPDARD system an As-Placed database (APD) of As-Placed coordinates of said new piles and said new rig target positions; and sending said APD back to said base station using said communication link.

2. The method of claim 1, wherein said step of updating said JD further includes the steps of:

adding the initial coordinates of new piles to said JD;

selecting and adding to said JD the coordinates of said new piles target positions and the coordinates of said new rigs target positions; and selecting the configuration parameters for navigation and adding said configuration navigation parameters to said JD.

3. The method of claim 2, wherein said step of adding the initial coordinates of new piles and new rigs to said JD further includes the step of keying in said JD by the operator the initial coordinates of each said new pile.

4. The method of claim 2, wherein said step of adding the initial coordinates of new piles to said JD further includes the step of loading in said JD a PILE FILE containing the initial coordinates of each said new pile.

5. The method of claim 2, wherein said step of selecting and adding to said JD the coordinates of said new piles target positions and the coordinates of said new rigs target positions further includes the step of generating a TARGET POSITIONS FILE.

6. The method of claim 5, wherein said step of generating said TARGET POSITIONS FILE further includes the steps of:

generating the coordinates of each said new pile and rig target positions;

generating the points that form the target position boundary for each said new pile target position and for each said rig target position;

generating the pile code for each said new pile;

generating the required depth tolerances for each said new pile target position and for each said rig target position; and generating the required tilt tolerances for each said new pile target position and for each said rig target position.

7. The method of claim 2, wherein said step of selecting the configuration parameters for navigation and adding said configuration parameters to said JD further includes the steps of:

introducing the parameters including the units of measurements that are used by said CAPPDARD computer display;

introducing the parameters that control the calculation by said CAPPDARD computer the coordinates of each said new target positions, wherein said coordinates of each said new target position are determined using said location determination means;

introducing the tilt tolerances parameters for each said new pile target position and for each said rig target position;

introducing the depth tolerance parameters for each said new rig target position;

selecting the parameters that control the displayed graphical information on said CAPPDARD computer map display; and selecting the parameters that control the displayed text information on said CAPPDARD computer map display.

8. The method of claim 1, wherein said step of continuously determining its position locations by said CAPPDARD system further includes the step of determining its position locations by an inertial navigation system.

9. The method of claim 1, wherein said step of continuously determining its position locations by said CAPPDARD system further includes the step of determining its position locations by a gyroscope system.

10. The method of claim 1, wherein said step of continuously determining its position locations by said CAPPDARD system further includes the step of determining its position locations by a local magnetic field sensor system.

11. The method of claim 1, wherein said step of continuously determining its position locations by said CAPPDARD system further includes the step of determining its position locations by a Global Positioning System Receiver.

12. The method of claim 1, wherein said step of continuously determining its position locations by said CAPPDARD system further includes the step of determining its position locations by a Global Orbiting Navigational Satellite System Receiver.

13. The method of claim 1, wherein said step of continuously determining its position locations by said CAPPDARD system further includes the step of determining its position locations by a ground-based location determination system including a Loran system.

14. The method of claim 1, wherein said step of continuously determining its position locations by said CAPPDARD system further includes the step of determining its position locations by a ground-based location determination system including a Tacan system.

15. The method of claim 1, wherein said step of continuously determining its position locations by said CAPPDARD system further includes the step of determining its position locations by a ground-based location determination system including a Decca system.

16. The method of claim 1, wherein said step of continuously determining its position locations by said CAPPDARD system further includes the step of determining its position locations by a ground-based location determination system including an Omega system.

17. The method of claim 1, wherein said step of continuously determining its position locations by said CAPPDARD system further includes the step of determining its position locations by a ground-based location determination system including a JTIDS Relnav system.

18. The method of claim 1, wherein said step of continuously determining its position locations by said CAPPDARD system further includes the step of determining its position locations by a ground-based location determination system including a PLRS system.

19. The method of claim 1, wherein said step of continuously determining its position locations by said CAPPDARD system further includes the step of determining its position locations by a ground-based location determination system including a VOR/DME Receiver.

20. The method of claim 1, wherein said step of transferring said UJD from said base station to said CAPPDARD system using said communication link further includes the step of using a mechanical means for transferring said UJD from said base station to said CAPPDARD system.

21. The method of claim 1, wherein said step of transferring said UJD from said base station to said CAPPDARD system using said communication link further includes the step of using a radiowave frequency band.

22. The method of claim 1, wherein said step of transferring said UJD from said base station to said CAPPDARD system using said communication link further includes the step of using an infrared frequency band.

23. The method of claim 1, wherein said step of transferring said UJD from said base station to said CAPPDARD system using said communication link further includes the step of using a microwave frequency band.

24. The method of claim 1, wherein said step of transferring said UJD from said base station to said CAPPDARD system using said communication link further includes the step of using the ISM (industrial scientific medical) unlicensed operation band, and wherein the ISM band range is selected from a class of frequency range consisting of 900 MHz, 2.4 GHz, and 5.8 GHz; and wherein the user can own the both ends of the ISM communication system.

25. The method of claim 1, wherein said step of transferring said UJD from said base station to said CAPPDARD system using said communication link further includes the step of using a real time circuit switched communication link.

26. The method of claim 1, wherein said step of transferring said UJD from said base station to said CAPPDARD system using said communication link further includes the step of using a 1.8 GHz band, wherein said 1.8 GHz band supports the personal communications services (PCS).

27. The method of claim 1, wherein said step of transferring said UJD from said base station to said CAPPDARD system using said communication link further includes the step of using a Low Earth Orbiting Satellites (LEOS), wherein said LEOS is used to store and to forward digital packet data.

28. The method of claim 1, wherein said step of transferring said UJD from said base station to said CAPPDARD system using said communication link further includes the step of using a communication means, and wherein said communication means is selected from a class of radiowave communication means consisting of a cellular telephone communication means, paging signal receiving means, a wireless messaging services, a wireless application services, a wireless WAN/LAN station, and an Earth-satellite-Earth communication module that uses at least one satellite to relay a radiowave signal.

29. The method of claim 1, wherein said step of transferring said UJD from said base station to said CAPPDARD system using said communication link further includes the step of using a communication means, and wherein said communication means includes an Advanced Mobile Phone System (AMPS) including a modem, and wherein said modem is selected from a class consisting of a DSP (digital signal processor) modem, and a cellular digital packet data (CDPD) modem.

30. The method of claim 1, wherein said step of transferring said UJD from said base station to said CAPPDARD system using said communication link further includes the step of using a communication means, and wherein said communication means includes a digital cellular telephone communication means, and wherein said digital cellular telephone communication means includes a means of modulation of digital data over a radiolink selected from a class consisting of a time division multiple access (TDMA) system, and a code division multiple access (CDMA) system.

31. The method of claim 1, wherein said step of transferring said UJD from said base station to said CAPPDARD system using said communication link further includes the step of using a communication means, and wherein said communication means includes a fax wireless communication means.

32. The method of claim 1, wherein said step of driving said new piles to said new piles target positions by said CAPPDARD system according to said UJD further includes the steps of:

selecting from said UJD a first new pile to place and a target position for said first new pile;

moving said piling rig of said CAPPDARD system to said target position of said first pile using a map display information and a text display information;

adjusting said piling rig into said target position;

adjusting the verticality of said mast within said predetermined tolerance;

placing said first pile into said first target position;

generating and recording the As-Placed coordinates of said first placed pile; and repeating the above mentioned steps for each said pile to be placed according to said UJD.

33. The method of claim 32, said CAPPDARD system further including a depth meter and a tilt meter, wherein said step of adjusting said piling rig into said target position further includes the steps of:

changing said graphical map display into said centering target display when said piling rig gets closer than a predetermined distance from said target position;

measuring the depth of said first placed pile by said depth meter;

measuring the verticality of said first pile graphically by using said tilt meter; and displaying said verticality tilt of said first pile using said verticality tilt display.

34. The method of claim 1, wherein said step of drilling said new rig target positions by said CAPPDARD system according to said UJD further includes the steps of:

selecting from said UJD a first new rig target position;

moving said piling rig of said CAPPDARD system to said first rig target position using a map display information and a text display information;

adjusting said piling rig into said target position;

adjusting the verticality of said mast within said predetermined tolerance;

drilling said piling rig into said first rig target position;

generating and recording the As-Drilled coordinates of said first rig target position; and repeating the above mentioned steps for all said rig target positions to be drilled according to said UJD.

35. The method of claim 34, said CAPPDARD system further including a depth meter and a tilt meter, wherein said step of adjusting said piling rig into said target position further includes the step of:

changing said graphical map display into a centering target display when said piling rig gets closer than a predetermined distance from said target position;

measuring the depth of said first rig target position by said depth meter;

measuring the verticality of said piling rig by using said tilt meter; and displaying said measured verticality tilt of said first rig target position using said tilt display.

36. The method of claim 1, wherein said step of generating by said CAPPDARD system an As-Placed database (APD) of said new piles and said new rig target positions further includes the step of:

recording into one said As-Placed database As-Placed coordinates for each said placed pile and As-Drilled coordinates for each said drilled rig target position.

37. A system for remote computer assisted precise pile driving and rig drilling; said system further comprising:

a computer assisted pile driving and rig drilling system (CAPPDARD);

a base station; and a communication link connecting said CAPPDARD system and said base station.

38. The system of claim 37, wherein said CAPPDARD system further comprises:

a moving platform; said moving platform further including:

a piling rig connected to said moving platform; and a mast connected to said piling rig; wherein said mast includes a nominally vertical axis passing through the center of operation of said piling rig at ground level;

a location determination means attached to said moving platform;

a computer attached to said platform; said computer further comprising:

a computer display;

a computer memory connected to said computer display; and a computer software loaded into said computer memory; and a communication means connected to said computer.

39. The system of claim 38, wherein said CAPPDARD system further comprises:

a tilt meter connected to said moving platform;

a depth meter connected to said moving platform;

a centering map display connected to said computer; and a verticality tilt display connected to said computer.

40. The system of claim 37, wherein said base station further comprises:

a base station computer;

a base station communication means connected to said base station computer; and a base station software including an initial job database (JD) and an updated job database (UJD), wherein said base station software is installed into said base station computer.

41. The system of claim 38, wherein said location determination means is selected from a class of self-contained location determination systems, mounted on said moving platform, consisting of an inertial navigation system, a gyroscope system, and a local magnetic field sensor system.

42. The system of claim 38, wherein said location determination means is selected from a class of satellite-based location determination systems consisting of a Global Positioning System Receiver and a Global Orbiting Navigational Satellite System Receiver.

43. The system of claim 38, wherein said location determination means is selected from a class of ground-based location determination systems consisting of Loran, Tacan, Decca, Omega, JTIDS Relnav, PLRS, and VOR/DME Receiver.

44. The system of claim 37, wherein said communication link includes a mechanical means for transferring said UJD from said base station to said CAPPDARD system.

45. The system of claim 37, wherein said communication link includes a radiowave frequency band.

46. The system of claim 37, wherein said communication link includes an infrared frequency band.

47. The system of claim 37, wherein said communication link includes a microwave frequency band.

48. The system of claim 37, wherein said communication link includes the ISM (industrial scientific medical) unlicensed operation band, and wherein the ISM band range is selected from a class of frequency range consisting of 900 MHz, 2.4 GHz, and 5.8 GHz; and wherein the user can own the both ends of the ISM communication system.

49. The system of claim 37, wherein said communication link includes a real time circuit switched communication link.

50. The system of claim 37, wherein said communication link includes a 1.8 GHz band, wherein said 1.8 GHz band supports the personal communications services (PCS).

51. The system of claim 38, wherein said communication means includes a Low Earth Orbiting Satellites (LEOS), wherein said LEOS is used to store and to forward digital packet data.

52. The system of claim 38, wherein said communication means is selected from a class of radiowave communication means consisting of a cellular telephone communication means, paging signal receiving means, a wireless messaging services, a wireless application services, a wireless WAN/LAN station, and an Earth-satellite-Earth communication module that uses at least one satellite to relay a radiowave signal.

53. The system of claim 38, wherein said communication means includes an Advanced Mobile Phone System (AMPS) including a modem, and wherein said modem is selected from a class consisting of a DSP (digital signal processor) modem, and a cellular digital packet data (CDPD) modem.

54. The system of claim 38, wherein said communication means includes a digital cellular telephone communication means, and wherein said digital cellular telephone communication means includes a means of modulation of digital data over a radiolink selected from a class consisting of a time division multiple access (TDMA) system, and a code division multiple access (CDMA) system.

55. The system of claim 38, wherein said communication means includes a fax wireless communication means.

56. The system of claim 38, wherein said CAPPDARD system is operated by a human operator.

57. The system of claim 38, said CAPPDARD system further including a navigational computer attached to said moving platform, and wherein said CAPPDARD system is operated by said navigational computer.

* * * * *